Feb. 10, 1970   A. P. McGLINCHY   3,494,689
COMBINED REAR VIEW MIRROR AND SUN VISOR
Filed Jan. 27, 1969   2 Sheets-Sheet 1
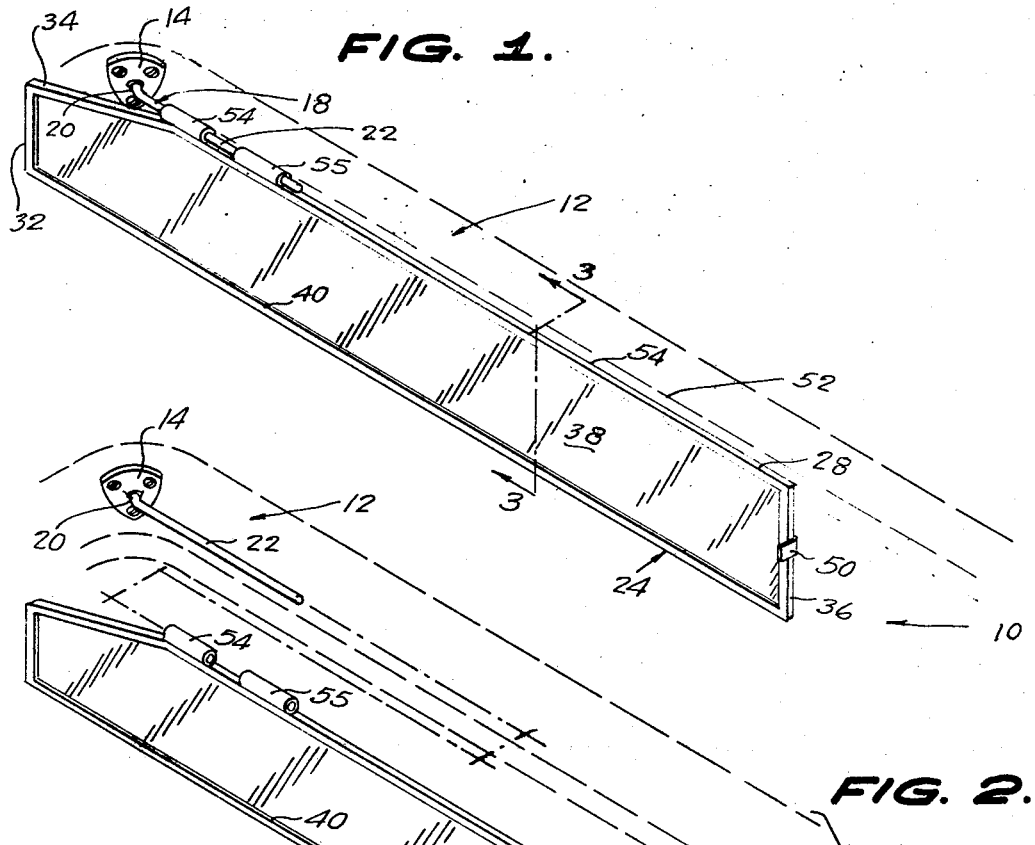
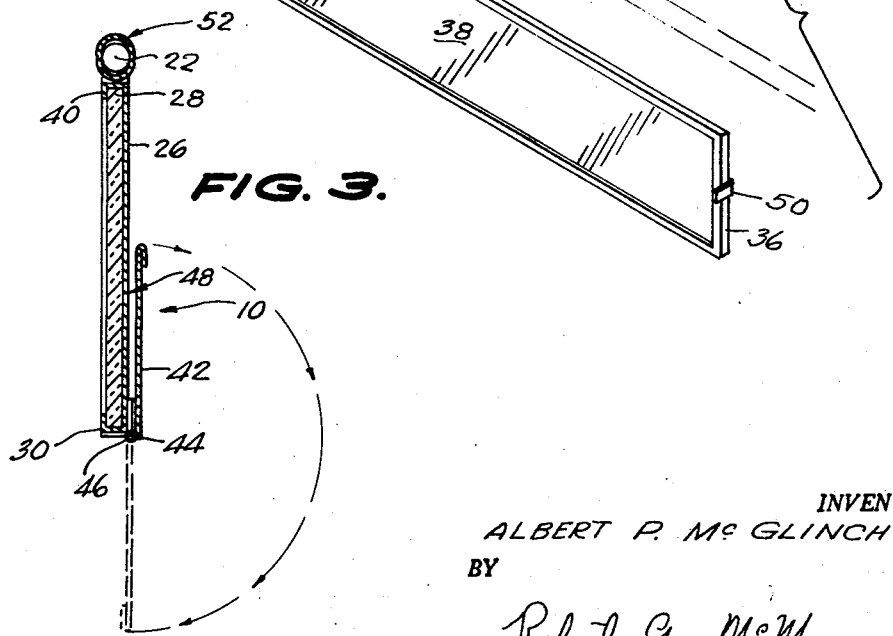
INVENTOR.
ALBERT P. McGLINCHY,
BY
Robert G. McMorrow
ATTORNEY.

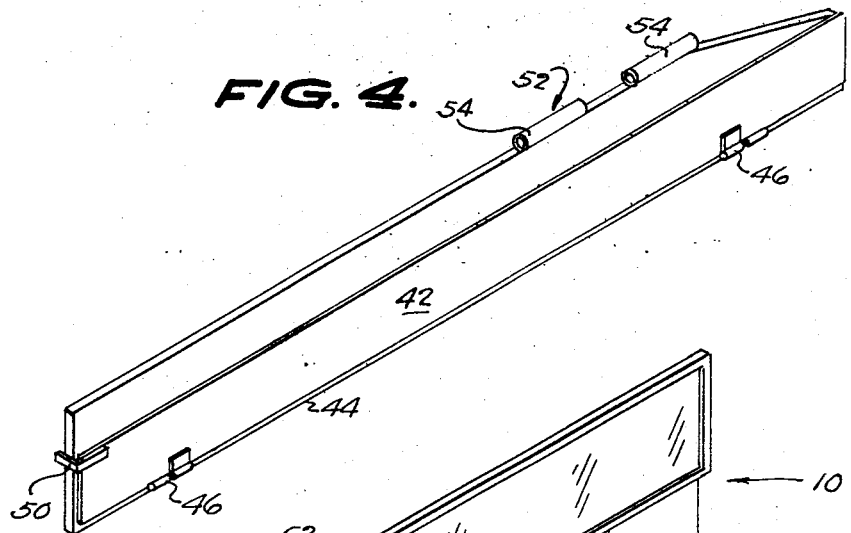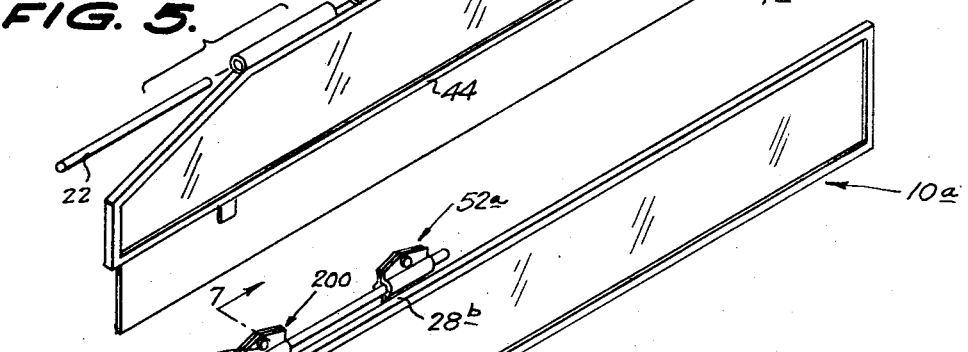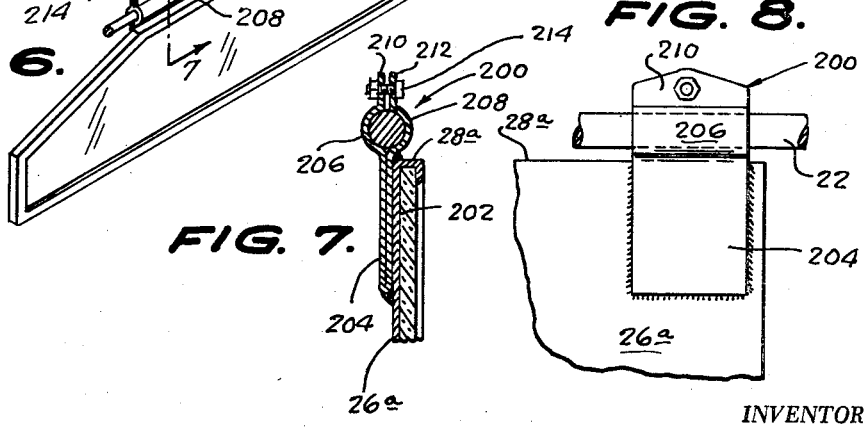

United States Patent Office 3,494,689
Patented Feb. 10, 1970

3,494,689
COMBINED REAR VIEW MIRROR AND SUN VISOR
Albert P. McGlinchy, 904 Van Patton St.,
Truth or Consequences, N. Mex. 87901
Filed Jan. 27, 1969, Ser. No. 794,172
Int. Cl. G02b 5/08
U.S. Cl. 350—307
2 Claims

ABSTRACT OF THE DISCLOSURE

An elongated mirror of rigid construction is of a configuration such that it extends across the full available vehicle frame area to maximize the rear viewing area, and the mirror assembly has associated storage compartment means which also serves as a supplemental visor means.

In a modification, the invention provides adjustable tension means for selective locking of the assembly in a given position.

BACKGROUND OF THE INVENTION

Field of the invention

This invention relates to rear vision devices for motor vehicles.

Statement of the prior art

It has heretofore been proposed to combine the functions of vehicle rear vision devices such as mirrors and visors in unitary structures. Examples of such prior devices are found in the following United States Patents:

2,123,319, Thompson, July 12, 1938; 2,517,872, Hamel, Aug. 8, 1950; 2,842,395, Davis, July 8, 1958; 2,958,559, Jensen, Nov. 1, 1960; 3,022,109, Hauskama, Feb. 20, 1962; 3,206,244, Kurvink, Sept. 14, 1965; 3,343,867, Couch et al., Sept. 26, 1967; and 3,375,364, Marcus, Mar. 26, 1968.

These prior devices have not found general acceptance, possibly due to the fact that they interfere with normal function of the visor or the mirror, or that they are overly complex. Moreover, some of the prior devices do not materially increase the viewing area, and none has the advantage of providing a combined additional visor and compartment forming member.

SUMMARY OF THE INVENTION

The present invention is directed to the provision of a combined visor and mirror which provides for a maximum viewing area without interference with the normal functioning of the standard mirror and which is securely and attractively mounted.

Most motor vehicles of current manufacture are provided with a body frame structure in which a pair of sun visors are pivotally mounted on the frame above the windshield. In this usual structure, a rear vision device in the form of an adjustable mirror is positioned between the visors. The present invention employs this existing visor mounting system, but substitutes a thin, elongated, substantially rectangular mirror for the conventional visor. This permits the vehicle operator, if desired, to utilize a rear vision device effectively extending across the full width of the available rear vison area, and at the same time, to utilize the shading effect of the visor.

An objective of the invention relates to the combining of a compartment for maps and other documents with a visor-mirror structure as aforesaid, wherein the compartment assembly also serves as a means for increasing the depth or downward extent of the visor when needed.

Still another important innovation provided by this invention resides in the means for mounting the visor-mirror. In view of the necessary increase in weight of the assembly as compared to conventional visors, as occasioned by the incorporation of the mirror in the visor, secure mounting means is a necessity. In providing this security of mounting, this invention employs a series of sleeve means in which the rod normally associated with conventional sun visors is journaled. In one modification of the invention, the sleeve means is provided with changeable fastening means, thereby permitting selective location of the combined visor-mirror.

Other and further objects and advantages of the invention will become apparent to those skilled in the art from a consideration of the following specification when read in conjunction with the annexed drawings.

BRIEF DESCRIPTION OF THE DRAWINGS

FIGURE 1 is a perspective view showing a first form of visor-mirror constructed and assembled in accordance with the teachings of this invention;

FIGURE 2 is a disassembled perspective view of the apparatus shown in FIGURE 1;

FIGURE 3 is an enlarged sectional view taken substantially on the section line 3—3 of FIGURE 1, looking in the direction of the arrows;

FIGURE 4 is a rear perspective view of the visor-mirror;

FIGURE 5 is a second disassembled perspective view of the invention;

FIGURE 6 is a perspective view of a modification of the mounting means of the invention;

FIGURE 7 is an enlarged, detail, sectional view taken substantially on the line 7—7 of FIGURE 6, looking in the direction of the arrows; and FIGURE 8 is an enlarged, fragmentary rear elevational view of the mounting means of the modified form of the invention.

DESCRIPTION OF THE PREFERRED EMBODIMENTS

In FIGURES 1 through 4 the invention hereof is generally identified by reference numeral 10 and will be seen to comprise a combined mirror and visor assembly. The invention is principally employed in the environment of a motor vehicle having a body frame structure 12 with brackets 14 secured at corner locations above a windshield 16. An elongated rod 18 has an enlarged first end 20 mounted within the bracket 14 in the usual swivel fashion, and the rod has a straight portion 22 of substantially cylindrical form which projects outwardly toward the center of the vehicle.

The combined visor and mirror includes a box like frame 24 formed of metal or other suitably rigid material. The frame comprises an upright back 26, a top 28, and bottom 30. An interior side 32 is joined with the top 28 by a slant side member 34 which provides an angle portion at the interior side of the frame. This angle portion permits clearance of the frame for pivoting about the frame structure of the vehicle, and also provides a reduced handle portion for ease of operation. The top and bottom members are joined at the opposite side of the frame by a vertical member 36.

As best shown in FIGURE 3, a mirror 38 formed of glass or the like, is mounted within the frame. Retaining flanges 40 extend inwardly from the sides, and from the top and bottom members and project inwardly to a depth such that the mirror is held within the frame.

An elongated outer plate 42 is connected along its lower edge 44 to a pair of hinges 46 which are also connected to the bottom 30 of the frame. The hinges 46 are fixedly secured to the bottom 30 of the frame at one side, and the hinges are of a depth such that the plate 42 is normally retained in spaced relation to the back 26. This space provides a compartment 48 for the storage of maps and other papers. At the end of the plate coincident with the side member 36, a spring clip 50 is provided, the clip being engageable about the frame to retain the plate in the position shown in FIGURE 4. When it is desired to release the contents of the compartment 48, disengagement of the clip permits pivotal movement of the plate to a downward position wherein it forms a vertical extension of the back member. In the latter position, the plate additionally functions as a supplemental visor.

An important feature of the invention involves its manner of mounting. In accomplishing the connection of the frame to the rod 18, dual sleeve means 52 is employed. The means 52 comprise elongated, tubular sleeves 54, 55 each of which, as shown in FIGURE 3, has an oblong sectional form, whereby its dimension along a first diameter is measurably different from its dimension along a second diameter perpendicular to the first diameter. The smaller of these is dimensioned for frictional engagement with the rod 18 whereby the sleeve tightly engages the main section 22 of the rod. Due to the loose fit at the other of said dimensions, pivotal movement of the frame about the rod is made possible.

A modification of the invention, denoted 10a in the drawings in FIGURES 6 through 8, involves sleeve means 52a comprising a pair of clamp assemblies 200 arranged adjacent to the ends of the frame. Each of the clamp assemblies comprises an inner plate 202 and an outer plate 204 integrally joined to one another along their lower edges. The inner plates are fixed, as by welding, to the frame back 26a and to the top 28a. Immediately above the top of the frame, each of the plates has a semi-circular, outwardly distended portion 206, 208, the portions collectively forming a sleeve. Ears 210, 212 project upwardly from the distended portions. The ears have aligned apertures therein through which changeable fastening means such as screw assemblies 214 are extended. As will be apparent, manipulation of the fastening means to tighten or loosen the same, permits either locking of the visor-mirror in selected position, or pivoting of the same.

As will be seen from the foregoing, the visor-mirror of this invention may be employed at either or both sides of a vehicle, and when employed at both sides, provides rear vision means extending substantialy the full width of the available viewing area. At such times as this type of rear vision means is not desirable, the visor-mirrors may be pivoted to an upward position wherein the mirrors face the body frame, thereby removing the mirrors from service.

Having described and illustrated two embodiments of this invention in some detail, it will be understood that these descriptions and illustrations have been offered only by way of example and that the invention is to be limited in scope only by the appended claims.

What is claimed is:

1. In a vehicle having a frame and having at least one bracket secured to the frame for swivel mounting of a sun visor, the vehicle having a windshield and the bracket being located on the frame adjacent the windshield, a combined visor, rear view mirror and storage compartment comprising:

an elongated rod, having a first end and an outer end, and the first end being movably secured for swivel mounting in the bracket;
the rod having a straight portion projecting from the bracket;
an elongated frame having a substantially imperforate, non-reflective back member, a top, a bottom, and opposite sides;
a mirror encased in said frame, the top, bottom and sides having retaining flanges thereon to hold the mirror within the frame, the mirror being of a configuration complementary to the configuration of the frame;
one of the sides being vertical, the other of the sides having a vertical portion and an angle portion adjacent the bracket to permit pivotal movement of the frame with respect to the bracket;
a pair of sleeves fixed on the top of the frame and having substantially coaxial openings therein, the sleeves being frictionally engaged with the straight portion of the rod, with the rod extending through said openings, whereby the frame is pivotal about the rod;
an elongated rectangular outer plate, the plate having a lower edge and having a side edge aligned with the vertical side of the frame;
hinges secured to the plate lower edge and to the bottom of the frame whereby the plate is pivotal with respect to the frame; and
a spring clip secured to the side edge of the plate and engageable with the vertical side of the frame to releasably hold the plate in a folded position adjacent the frame back member and to form, alternatively, a storage compartment between the back member and the plate, or to permit pivoting of the plate to a vertical position wherein it forms a vertical extension of the back of the frame wherein the pair of sleeves each comprise a series of pairs of clamping plates, the plates of the respective pair being joined about the rod by changeable fastener means whereby each comprises a tubular element frictionally engaging the rod.

2. The invention of claim 1 wherein:
each of the sleeves comprises a tube of oblong form, having a reduced dimension adapted to frictionally engage the rod.

References Cited

UNITED STATES PATENTS

| | | | |
|---|---|---|---|
| 1,518,956 | 12/1924 | Beitman | 350—277 |
| 2,323,072 | 6/1943 | Murata | 296—97.13 |
| 3,304,118 | 2/1967 | Jonas | 296—97 |
| 3,351,375 | 11/1967 | Wheeler | 296—97 |

DAVID SCHONBERG, Primary Examiner

MICHAEL J. TOKAR, Assistant Examiner

U.S. Cl. X.R.

296—97.13